(12) United States Patent
Takemoto (10) Patent No.: US 9,914,812 B2
(45) Date of Patent: *Mar. 13, 2018

(54) POLYOL COMPOSITION FOR PRODUCING FLEXIBLE POLYURETHANE FOAM, FLEXIBLE POLYURETHANE FOAM, AND METHOD FOR PRODUCING FLEXIBLE POLYURETHANE FOAM

(71) Applicants: TOYO TIRE & RUBBER CO., LTD., Osaka-shi, Osaka (JP); ADVANCED SOFTMATERIALS INC., Kashiwa-shi, Osaka (JP)

(72) Inventor: Masahiko Takemoto, Osaka (JP)

(73) Assignees: TOYO TIRE & RUBBER CO., LTD., Osaka-shi (JP); ADVANCED SOFTMATERIALS INC., Kashiwa-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,373

(22) Filed: Apr. 13, 2016

(65) Prior Publication Data

US 2016/0304689 A1 Oct. 20, 2016

(30) Foreign Application Priority Data

Apr. 17, 2015 (JP) ................. 2015-084600

(51) Int. Cl.
| | |
|---|---|
| C08J 9/00 | (2006.01) |
| C08B 37/16 | (2006.01) |
| C08G 18/64 | (2006.01) |
| C08G 18/65 | (2006.01) |
| C08G 18/72 | (2006.01) |
| C08G 18/76 | (2006.01) |
| C08G 18/32 | (2006.01) |
| C08G 18/40 | (2006.01) |
| C08G 18/48 | (2006.01) |
| C08L 5/16 | (2006.01) |
| C08G 101/00 | (2006.01) |

(52) U.S. Cl.
CPC ......... *C08J 9/0061* (2013.01); *C08B 37/0015* (2013.01); *C08G 18/3275* (2013.01); *C08G 18/409* (2013.01); *C08G 18/4009* (2013.01); *C08G 18/4804* (2013.01); *C08G 18/6484* (2013.01); *C08G 18/6535* (2013.01); *C08G 18/721* (2013.01); *C08G 18/7621* (2013.01); *C08G 18/7664* (2013.01); *C08L 5/16* (2013.01); *C08G 2101/0008* (2013.01); *C08G 2101/0058* (2013.01); *C08G 2101/0083* (2013.01); *C08J 2375/08* (2013.01)

(58) Field of Classification Search
CPC ........... C08B 37/0015; C08G 18/3275; C08G 18/4009; C08G 18/409; C08G 18/4804; C08G 18/6484; C08G 18/6535; C08G 18/721; C08G 18/7621; C08G 18/7664; C08G 83/007; C08G 2101/0008; C08G 2101/0058; C08G 2101/0083; C08J 9/0061; C08J 2375/08; C08L 5/16

See application file for complete search history.

(56) References Cited

U.S. PATENT DOCUMENTS

2006/0189704 A1* 8/2006 Dexheimer ........ C08G 18/4833
521/99

FOREIGN PATENT DOCUMENTS

| CA | 2 898 287 A1 | 7/2014 |
|---|---|---|
| EP | 1 995 290 A1 | 11/2008 |
| JP | 2012-045104 A | 3/2012 |
| WO | 2015/159875 A1 | 10/2015 |
| WO | WO 2015/159875 | * 10/2015 |
| WO | 2015/174187 A1 | 11/2015 |
| WO | WO 2015/174187 | * 11/2015 |

OTHER PUBLICATIONS

European Search Report dated Aug. 19, 2016, issued in counterpart European Patent Application No. 16164728.4. (7 pages).
Non-Final Office Action dated Jan. 11, 2017, issued in U.S. Appl. No. 15/097,771 (13 pages).
Final Office Action dated Jul. 27, 2017, issued in U.S. Appl. No. 15/097,771 (14 pages).
Office Action dated Nov. 30, 2017, issued in German Application No. 10 2016 206 008.2, with English translation (8 pages).

* cited by examiner

*Primary Examiner* — John Cooney
(74) *Attorney, Agent, or Firm* — Westerman, Hattori, Daniels & Adrian, LLP (57) ABSTRACT

A polyrotaxane is blended into a polyol composition, which can reduce the tensile stress of a flexible polyurethane foam. A vertical compressive stress due to the weight of a sitting user and a tensile stress due to the input of lateral vibrations act on a urethane pad. However, by reducing the tensile stress of the flexible polyurethane foam, the direction (inclination) of a resultant force obtained by combining the compressive stress and the tensile stress can be brought close to the vertical direction. Thus, the angle of inclination of the user's hip (ischium) on the urethane pad to the vertical direction due to the input of lateral vibrations can be reduced, so that the sense of wobble of the urethane pad can be reduced.

7 Claims, 5 Drawing Sheets

POLYOL COMPOSITION FOR PRODUCING FLEXIBLE POLYURETHANE FOAM, FLEXIBLE POLYURETHANE FOAM, AND METHOD FOR PRODUCING FLEXIBLE POLYURETHANE FOAM

TECHNICAL FIELD

The present invention relates to polyol compositions for producing flexible polyurethane foams, flexible polyurethane foams, and methods for producing flexible polyurethane foams and particularly relates to a polyol composition, a flexible polyurethane foam, and a method for producing a flexible polyurethane foam from or according to which a urethane pad capable of reducing a sense of wobble can be produced.

BACKGROUND ART

Urethane pads used for seats mounted on conveyances, such as vehicles, boats, ships, and aircraft, furniture chairs, and the like may give users a sense of lateral wobble. For example, an urethane pad mounted on a vehicle may be deformed by vibrations in a low-frequency band (for example, about 1 Hz) input when the vehicle goes around a mild curve or makes a lane change, resulting in production of a sense of wobble, such as sideslip or lateral rocking about a roll axis. Such a sense of wobble is a factor affecting the steering stability. There is a technique, for reducing the sense of wobble, in which tan δ with respect to vibrations in a low-frequency band is set in a predetermined range (Patent Literature 1).

CITATION LIST

Patent Literature

[Patent Literature 1] JP-A No. 2012-45104

SUMMARY OF INVENTION

Technical Problem

However, there is a demand for further reduction of the sense of wobble over the above-described known technique. The present invention has been made to respond to the above demand and has an object of providing a polyol composition, a flexible polyurethane foam, and a method for producing a flexible polyurethane foam from or according to which a urethane pad capable of reducing a sense of wobble can be produced.

Solution to Problem and Advantageous Effects of Invention

To achieve the above object, a polyol composition for producing a flexible polyurethane foam set forth in claim 1 contains a polyol component, an isocyanate component, a polyrotaxane, and a medium capable of dissolving or dispersing the polyrotaxane. Since the polyrotaxane includes: an axle molecule including hydroxyl group-containing cyclic molecules thereon in a skewered manner; and stopper groups placed at both ends of the axle molecule, the cyclic molecules of the polyrotaxane are cross-linked with a flexible polyurethane foam when the flexible polyurethane foam is formed by the reaction of the hydroxyl groups of the polyol component with the isocyanate groups of the isocyanate component. In the polyrotaxane, the axle molecule slides through the cross-linking points (cyclic molecules) to such an equilibrium position that a tension acting on the flexible polyurethane foam becomes equalized, thus distributing the stress heterogeneity. Therefore, the flexible polyurethane foam can reduce the tensile stress as compared with a flexible polyurethane foam containing no polyrotaxane blended.

When lateral vibrations in a low-frequency band are input to a urethane pad made of this flexible polyurethane foam with a user sitting on the urethane pad, a vertical compressive stress due to the user's weight and a tensile stress due to the input of the lateral vibrations act on the urethane pad. The direction (inclination) of a resultant force obtained by combining the compressive stress and the tensile stress can be brought close to the vertical direction if the tensile stress of the flexible polyurethane foam can be reduced because the polyrotaxane has substantially no effect on the compressive properties of the flexible polyurethane foam. Thus, the angle of inclination of the user's hip (ischium) to the vertical direction due to the input of vibrations can be reduced, which has the effect of reducing the sense of wobble of the urethane pad.

Furthermore, the polyrotaxane including hydroxyl group-containing cyclic molecules is dissolved or dispersed in the medium. Therefore, when the hydroxyl groups of the polyol component react with the isocyanate groups of the isocyanate compound, they can be cross-linked with the cyclic molecules of the polyrotaxane to disperse the polyrotaxane into the flexible polyurethane foam. As a result, the effect is produced of homogenizing the effect of reducing the tensile stress acting on the flexible polyurethane foam.

In a polyol composition set forth in claim 2, the medium contains as a main ingredient a compound having a weight-average molecular weight of 100 or more, which can ensure the solubility or dispersibility of the polyrotaxane into the medium. As a result, in addition to the effects of claim 1, the effect is produced of further enhancing the effect of homogenizing the flexible polyurethane foam.

In a polyol composition set forth in claim 3, the medium contains as a main ingredient a compound having one or two hydroxyl groups per molecule, which can prevent, by means of the medium, the cross-linking density of the polyrotaxane from becoming high. As a result, the degree of freedom at which the axle molecule slides through the cross-linking points (cyclic molecules) can be ensured. Therefore, in addition to the effects of claim 1, the effect is produced of surely reducing the tensile stress of the flexible polyurethane foam.

In a polyol composition set forth in claim 4, the medium is a surfactant, which can increase the dispersibility of the polyrotaxane into the medium. Thus, in addition to the effects of claim 1, the effect is produced of improving the dispersibility of the polyrotaxane to further increase the homogeneity of the flexible polyurethane foam.

In a polyol composition set forth in claim 5, the medium contains a polyoxyalkylene group-containing compound as a main ingredient, which can improve the compatibility with the polyol component forming a skeleton of the flexible polyurethane foam. As a result, in addition to the effects of claim 1, the effect is produced of improving the dispersibility of the polyrotaxane to further increase the homogeneity of the flexible polyurethane foam.

In a flexible polyurethane foam set forth in claim 6, the polyol composition according to claim 1 is foamed and cured, which has the same effects as claim 1.

In a method for producing a flexible polyurethane foam set forth in claim 7, after in a first step the polyrotaxane is dissolved or dispersed into the medium of the polyol composition according to claim 1 to obtain a solution, the solution obtained in the first step is mixed with a polyol component and an isocyanate component in a second step to obtain a mixture liquid. The mixture liquid obtained in the second step is foamed and cured in a third step. Therefore, the same effects as in claim 1 can be produced.

DESCRIPTION OF EMBODIMENTS

Figure 1:
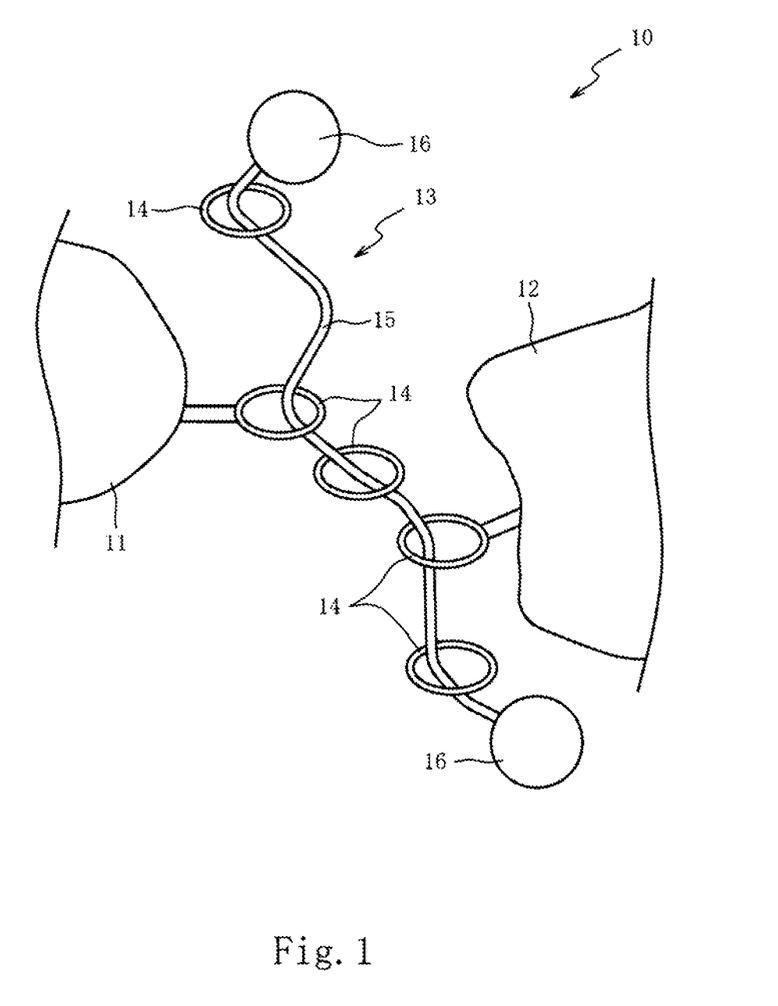
FIG. 1 is a schematic view of the microstructure of a flexible polyurethane foam according to one embodiment of the present invention.
Figure 2:
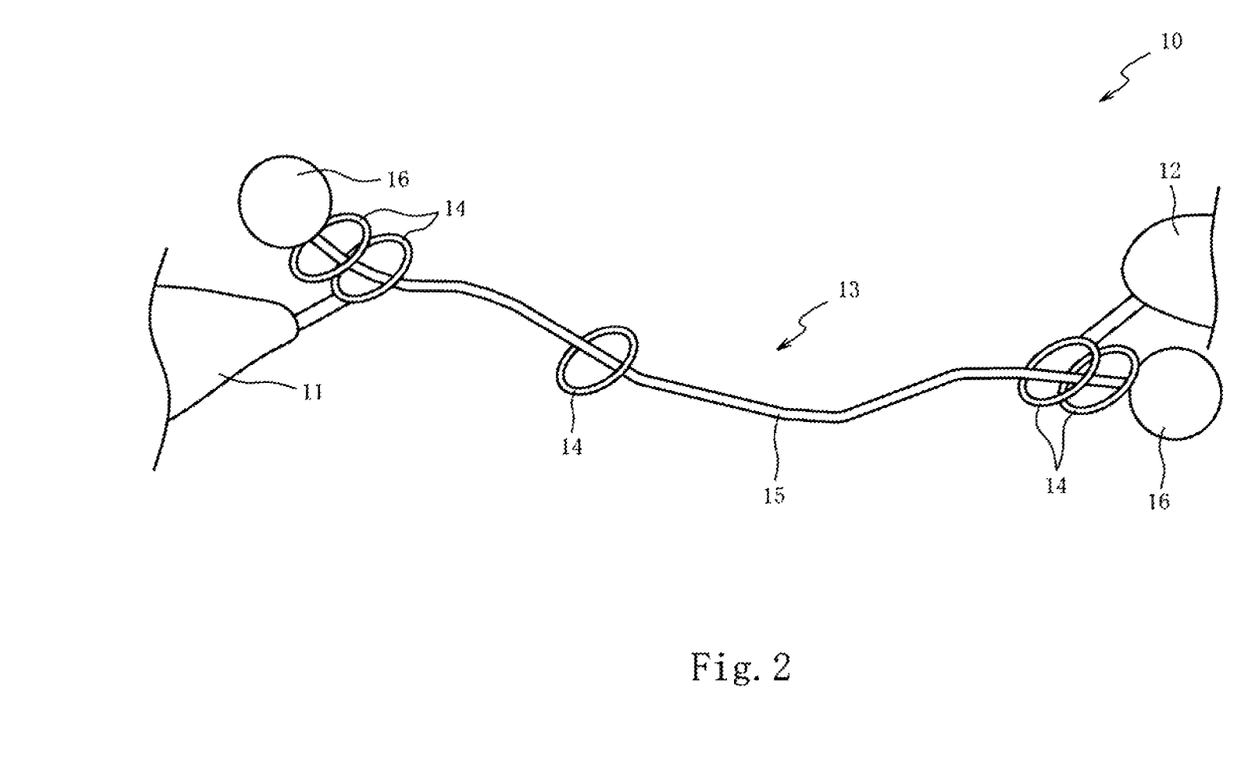
FIG. 2 is a schematic view of the microstructure of the flexible polyurethane foam when a tension is applied thereto.

Hereinafter, a description will be given of a preferred embodiment of the present invention with reference to the accompanying drawings. FIG. 1 is a schematic view of the microstructure of a flexible polyurethane foam 10 according to one embodiment of the present invention and FIG. 2 is a schematic view of the microstructure of the flexible polyurethane foam 10 when a tension is applied thereto. As shown in FIG. 1, the flexible polyurethane foam 10 includes: polymers 11, 12 obtained by reaction of hydroxyl groups of a polyol component with isocyanate groups of an isocyanate component; and a polyrotaxane 13. The polyrotaxane 13 has a structure in which an axle molecule 15 includes a large number of cyclic molecules 14 to skewer them through their openings and stopper groups 16 bind to both terminals of the axle molecule 15. The stopper groups 16 prevent the cyclic molecules 14 from sliding off the axle molecule 15. The flexible polyurethane foam 10 has a structure in which the polymers 11, 12 are cross-linked with the cyclic molecules 14 of the polyrotaxane 13.

As shown in FIG. 2, the polyrotaxane 13 allows the cyclic molecules 14 to be free to move along the axle molecule 15. When a tensile force is applied to the flexible polyurethane foam 10, the cross-linking points (cyclic molecules 14) of the polyrotaxane 13 move (the pulley effect), so that local generation of stresses in the cross-linked structures can be reduced. Thus, the tensile stress (tensile modulus) of the flexible polyurethane foam 10 can be reduced. In contrast, when a compressive force is applied to the flexible polyurethane foam 10, a compressive stress generates between the polymers 11, 12 and the polyrotaxane 13 has substantially no effect on the compressive properties of the flexible polyurethane foam 10.

Figure 3A:
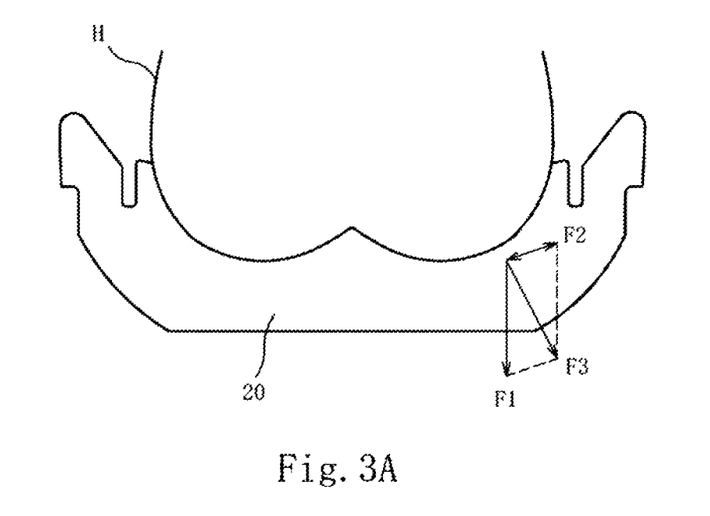
FIG. 3A is a schematic view showing a stress acting on a urethane pad and FIG. 3B is a schematic view showing a stress acting on a conventional urethane pad.
Figure 3B:
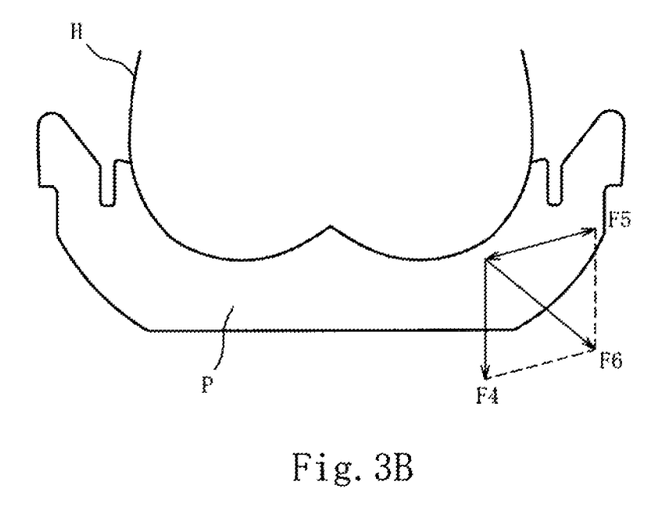

With reference to FIG. 3, a description will be given of a sense of wobble which a urethane pad 20 (urethane pad) as one of applications of the flexible polyurethane foam 10 gives a user H. FIG. 3A is a schematic view showing a stress acting on the urethane pad 20 and FIG. 3B is a schematic view showing a stress acting on a conventional urethane pad P. FIGS. 3A and 3B show a state where the user H sits on the urethane pads 20, P. Note that the arrows U-D, L-R, and F-B show the vertical direction, the right to left direction, and the front-to-rear direction, respectively, of vehicles (not shown) on which the urethane pads 20, P are mounted.

As shown in FIGS. 3A and 3B, when the user H sits on each of the urethane pads 20, P, a compressive stress F1, F4 in the vertical direction (direction of the arrow U-D) and a tensile stress F2, F5 in the lateral direction (direction of the arrow L-R) act on each urethane pad 20, P by the user's weight. The tensile stress F2 of the urethane pad 20 is smaller than the tensile stress F5 of the urethane pad P since the polyrotaxane 13 (see FIG. 1) is blended in the urethane pad 20. The inclination of the resultant force F3 obtained by combining the compressive stress F1 and the tensile stress F2 with respect to the vertical direction can be smaller than the inclination of the resultant force F6 obtained by combining the compressive stress F4 and the tensile stress F5 with respect to the vertical direction because the compressive stresses F1, F4 in the vertical direction acting on the respective urethane pads 20, P are approximately equal to each other.

When in this condition there is an input of vibrations in a low-frequency band (for example, about 1 Hz) in the lateral direction (the direction of the arrow L-R), as produced when a vehicle goes around a mild curve or makes a lane change, the direction and magnitude of the tensile stress F2, F5 change and the direction and magnitude of the resultant force F3, F6 also change accordingly. The urethane pad 20 can bring the direction (inclination) of the resultant force F3 close to the vertical direction as compared with the direction of the resultant force F6 of the urethane pad P. As a result, the urethane pad 20 can have a small angle of inclination of the hip (ischium) of the user H to the vertical direction due to the input of vibrations as compared with the urethane pad P. Thus, the urethane pad 20 can reduce the sense of wobble that the user H feels.

Referring back to FIG. 1, a description will be given of the polyrotaxane 13 essential for the flexible polyurethane foam 10. No particular limitation is placed on the type of the cyclic molecules 14 of the polyrotaxane 13 except that they are included on the axle molecule 15. Examples that can be cited as the cyclic molecule 14 include cyclodextrins, crown ethers, benzo-crowns, dibenzo-crowns, dicyclohexano-crowns, calixarenes, cyclophanes, cucurbiturils, porphyrins, lactams, and derivatives or modified forms of these compounds. The cyclic molecules 14 can be used in the form of a single compound of the above compounds or a combination of more than one of them. The cyclic molecule 14 is sufficient if it is substantially cyclic and even an incompletely closed ring, such as a C-shape, can be used as the cyclic molecule 14. The incompletely closed cyclic molecule 14 may have a helical structure.

The cyclic molecule 14 used is a cyclic molecule having one or more types of functional groups among hydroxyl group, carboxyl group, amino group, epoxy group, isocyanate group, thiol group, aldehyde group, and so on. This is for the purpose of, when the polyol component reacts with the isocyanate component, cross-linking them through the functional group with the polyrotaxane 13. Although the functional group of the cyclic molecule 14 is not limited to these types, it is preferably a group not reacting with the stopper groups 16.

The functional group of the cyclic molecule 14 may be bonded directly or through a spacer to another cyclic molecule 14. Although no limitation is placed on the type of the spacer, the spacer can be added to provide handleability, solubility, compatibility, and so on. Examples that can be cited as the spacer include alkylene, polyethylene oxide, polypropylene oxide, polycaprolactone, and polyalkylene carbonate.

The functional group of the cyclic molecule 14 that can be suitably used is a hydroxyl group or an isocyanate group. In the case of hydroxyl group, while the polymers 11, 12 are obtained by the reaction of the hydroxyl groups of the polyol component with the isocyanate groups of the isocyanate component, it is possible to react and cross-link the hydroxyl groups of the cyclic molecules 14 with the isocyanate groups of the isocyanate component. In the case of isocyanate group, while the polymers 11, 12 are likewise obtained, it is possible to react and cross-link the isocyanate groups of the cyclic molecules 14 with the hydroxyl groups of the polyol component. The particularly preferred functional group of the cyclic molecule 14 is a hydroxyl group. This is because the polyrotaxane 13 can be easy to handle.

It is preferred that their functional groups should be alkylated (modified) to adjust the hydroxyl value (functional value) because the cyclic molecules 14 control the reactivity. The hydroxyl value of the polyrotaxane 13 is preferably set at 30 to 85 mgKOH/g and more preferably set at 30 to 50 mgKOH/g. Note that the hydroxyl value is measured in conformity to JIS K1557-1:2007 edition (ISO 14900:2001 edition).

Examples that can be cited as alkylation (modification) include acetylation, propionylation, butyl esterification, ethyl carbamoylation, butyl carbamoylation, hexyl carbamoylation, octadecyl carbamoylation, and cyclohexyl carbamoylation, but are not limited to them.

If the hydroxyl value of the polyrotaxane 13 is 30 to 85 mgKOH/g, this can prevent the cross-linking density of the cyclic molecules 14 from being too high. As a result, the degree of freedom at which the cyclic molecules 14 can move along the axle molecule 15 after being cross-linked can be ensured, which can ensure the effect of reducing the tensile stress of the flexible polyurethane foam 10. In particular, if the hydroxyl value of the polyrotaxane 13 is 30 to 50 mgKOH/g, this can stably produce the effect of reducing the tensile stress of the flexible polyurethane foam 10.

Where the amount (maximum inclusion amount) at which the cyclic molecules 14 can be maximally included on the axle molecule 15 is 1, the inclusion amount at which the cyclic molecules 14 are to be included on the axle molecule 15 is preferably 0.1 to 0.6. If the ratio of the inclusion amount to the maximum inclusion amount of the cyclic molecules 14 is 0.1 to 0.6, the degree of freedom at which the cyclic molecules 14 can move along the axle molecule 15 can be ensured, which can ensure the effect of reducing the tensile stress of the flexible polyurethane foam 10. The ratio of the inclusion amount to the maximum inclusion amount is more preferably 0.1 to 0.5 and still more preferably 0.2 to 0.4. This is for the purpose of increasing the stability with which the pulley effect develops.

The axle molecule 15 is sufficient if it is a substantially linear chain molecule, and it may have a branched chain so long as the cyclic molecules 14 can be included thereon to cause the pulley effect. Examples that can be cited as the axle molecule 15 include: polyesters, such as polyalkylenes and polycaprolactones; polyethers, such as polyethylene glycol; polyamides; polyacrylics, and benzene ring-containing linear molecules. The axle molecule 15 preferably has a molecular weight of 1000 to 60000 and suitably has a molecular weight of 5000 to 30000. Depending on the type of the cyclic molecules 14, smaller molecular weights of the axle molecule 15 show a tendency to lower the pulley effect and greater molecular weights of the axle molecule 15 show a tendency to lower the solubility and affect the foamability of the flexible polyurethane foam 10.

The axle molecule 15 preferably has functional groups at both terminals. This is for the purpose of reacting the functional groups with the stopper groups 16 to bond the stopper groups 16 to both the terminals of the axle molecule 15. The functional groups at both the terminals of the axle molecule 15 can be appropriately selected depending on the type of the stopper groups 16 and examples thereof include hydroxyl group, amino group, carboxyl group, and thiol group.

The stopper groups 16 are atom groups placed at both the terminals of the axle molecule 15 and may be any atom groups so long as their steric hindrance (bulkiness or ionic interaction) enables the retention of a state where the cyclic molecules 14 are included on the axle molecule 15. Examples that can be cited as the stopper group 16 include: dinitrophenyl groups, such as 2,4-dinitrophenyl group and 3,5-dinitrophenyl group; cyclodextrins; adamantane groups; trityl groups; fluoresceins; pyrenes; and derivatives or modified forms of them.

Next, a description will be given of a method for producing a flexible polyurethane foam 10. The description here is a method for producing a flexible polyurethane foam 10 in which a polyrotaxane 13 containing hydroxyl groups as functional groups of the cyclic molecules 14 is used. The flexible polyurethane foam 10 is produced in a manner that a mixture liquid (polyol composition) containing a polyol component, an isocyanate component, a medium containing a polyrotaxane 13 dissolved or dispersed therein, a foaming agent, and a catalyst is poured into a molding tool (not shown) and then foamed and cured in the molding tool.

Examples that can be cited as the polyol component include polyols, such as polyether polyols, polyester polyols, polycarbonate polyols, polyolefin polyols, and lactone-based polyols and a single polyol or a mixture of two or more of these polyols can be used. Preferred among them are polyether polyols from the viewpoint of low cost of raw materials and excellent water resistance.

The polyol component may be used in combination with a polymer polyol as necessary. An example that can be cited as the polymer polyol is one obtained by graft copolymerization of a polyether polyol made of polyalkylene oxide with a polymer component, such as polyacrylonitrile or acrylonitrile-styrene copolymer.

The weight-average molecular weight of the polyol component is preferably 3000 to 10000. If the weight-average molecular weight is less than 3000, the resultant foam will lose flexibility, which is likely to cause deteriorated physical properties and reduced elastic performance. If the weight-average molecular weight is more than 10000, the hardness of the foam is likely to decrease.

Examples that can be used as the isocyanate component include various kinds of known polyfunctional aliphatic, alicyclic, and aromatic isocyanates. Examples that can be cited include tolylene diisocyanate (TDI), diphenylmethane diisocyanate (MDI), dicyclohexylmethane diisocyanate, triphenyl diisocyanate, xylene diisocyanate, polymethylene polyphenylene polyisocyanate, hexamethylene diisocyanate, isophorone diisocyanate, ortho-toluidine diisocyanate, naphthylene diisocyanate, xylylene diisocyanate, and lysine diisocyanate and these compounds may be used alone or in combination of two or more.

Examples that can be cited as MDI-based isocyanate represented by diphenylmethane diisocyanate include diphenylmethane diisocyanate (pure MDI), polyphenylene polymethylene polyisocyanate (polymeric MDI), their polymeric forms, their urethane-modified forms, their urea-modified forms, their allophanate-modified forms, their biuret-modified forms, their carbodiimide-modified forms, their uretonimine-modified forms, their uretdione-modified forms, their isocyanurate-modified forms, and mixtures of two or more of them.

Terminal isocyanate prepolymers can be used as the isocyanate component. Terminal isocyanate prepolymers are those obtained by previously reacting a polyol, such as a polyether polyol or a polyester polyol, with a polyisocyanate (such as a TDI-based isocyanate or an MDI-based isocyanate). The use of such a terminal isocyanate prepolymer is suitable because this enables the control of the viscosity of the mixture liquid (foaming stock solution), the primary structure of the polymer, and the compatibility.

In this embodiment, MDI-based isocyanates are preferably used as the isocyanate component because they can be molded in elastic foams having smaller rebound resilience than elastic foams of TDI-based isocyanates. In the case where a mixture of an MDI-based isocyanate and a TDI-based isocyanate is used, the mass ratio between MDI-based and TDI-based isocyanates is 100:0 to 75:25 and preferably 100:0 to 80:20. As the mass ratio of the TDI-based isocyanate in the isocyanate component is larger than 20/100, the sense of wobble of the resultant product (urethane pad) tends to decrease. When the mass ratio of the TDI-based isocyanate is larger than 25/100, the tendency is significant.

The isocyanate index of the isocyanate component (the percentage of the equivalence ratio of isocyanate groups to active hydrogen groups) is set at, for example, 85 to 130. The isocyanate index is determined relative to all the active hydrogen groups in the other components, including the polyol component, the polyrotaxane, the medium, and the cross-linking agent.

The amount of the polyrotaxane blended is preferably 0.9 to 30 parts by mass relative to 100 parts by mass of the polyol component. This is for the purpose of preventing the polyrotaxane from interfering with the foaming of the flexible polyurethane foam and reducing the tensile stress of the flexible polyurethane foam. As the amount of polyrotaxane blended relative to 100 parts by mass of polyol component is larger than 30 parts by mass, the foaming of the flexible polyurethane foam tends to be more inhibited. As the amount of polyrotaxane blended is smaller than 0.9 parts by mass, the tensile stress of the flexible polyurethane foam tends to be less likely to decrease.

The medium is a compound serving as a solvent or a dispersion medium for the polyrotaxane and good solvents having high solubility of polyrotaxane as well as poor solvents (dispersion media) having low solubility of polyrotaxane can be used as the medium without limitation. By dissolving or dispersing the polyrotaxane into the medium and mixing the medium with the polyol component or the isocyanate component, it can be prevented that the polyrotaxane is locally present in the mixture liquid (polyol composition). As a result, the homogeneity of the polyrotaxane in the flexible polyurethane foam can be increased.

Examples that can be cited as the medium include surfactants and hydroxyl compounds, such as alcohols. Examples of the surfactants that can be cited include anionic surfactants, cationic surfactants, non-ionic surfactants, and zwitterionic surfactants. These surfactants can be used individually or as a mixture of two or more.

Examples of the anionic surfactants that can be cited include polyoxyethylene alkyl ether acetates, dialkyl sulfosuccinates, dodecylbenzene sulfonates, laurylates, polyoxyethylene alkyl ether sulfates, alkyl allyl sulfonates, alkyl naphthalene sulfonates, alkyl phosphates, alkyl sulfates, alkyl sulfonates, alkyl ether sulfates, alkyl sulfosuccinates, alkyl ester sulfates, alkyl benzene sulfonates, alkyl diphenyl ether disulfonates, alkyl aryl ether phosphates, alkyl aryl ether sulfates, alkyl aryl ether ester sulfates, olefin sulfonates, alkane olefin sulfonates, polyoxyethylene alkyl ether phosphates, polyoxyethylene alkyl ether sulfates, ether carboxylates, sulfosuccinates, α-sulfo-fatty acid esters, fatty acid salts, condensates of higher fatty acids and amino acids, and naphthenates.

Examples of the cationic surfactants that can be cited include alkylamine salts, dialkylamine salts, aliphatic amine salts, benzalkonium salts, quaternary ammonium salts, alkylpyridinium salts, imidazolinium salts, sulfonium salts, and phosphonium salts.

Examples of the non-ionic surfactants that can be cited include: ether type non-ionic surfactants, such as polyoxyethylene alkyl ether, polyoxyethylene lauryl ether, polyoxyalkylene alkyl ether, polyoxyethylene polyoxypropylene alkyl ether, polyoxyethylene polyoxypropylene monobutyl ether, polyoxyethylene alkylphenyl ether and polyoxyethylene nonylphenyl ether; ester ether type non-ionic surfactants, such as polyoxyethylene oleate ester, glycerin fatty acid ester, polyoxyethylene stearate ester, polyoxyethylene fatty acid (lauryl) methyl ester, polyethylene glycol oleate monoester, and polyoxyethylene sorbitan fatty acid ester; ester type non-ionic surfactants, such as polyoxyethylene alkyl ester, sucrose fatty acid ester, and sorbitan fatty acid ester; alkyl glycosides, such as octyl glycoside; alkanolamide type non-ionic surfactants, such as polyoxyethylene oleic amide and polyoxyethylene alkylamide; amine oxides, such as dodecyldimethylamine oxide and tetradecyldimethylamine oxide; alkylamine type non-ionic surfactants, such as polyoxyethylene alkylamine and polyoxypropylene polyoxyethylene alkylamine; and higher alcohols, such as cetanol, stearyl alcohol, and oleyl alcohol.

Examples of the zwitterionic surfactants that can be cited include: imidazoline derivatives, such as imidazolinium betaine; dimethylalkyllauryl betaine; alkylglycine; and alkyldi(aminoethyl)glycine.

Examples of the hydroxyl compounds that can be cited include: alcohols, such as polyols and aliphatic alcohols; phenols; and hydroxyl group-containing compounds, such as hydrocracked products of polyols. When the medium is a polyol, the medium is part of the polyol component. The hydrocracked product of a polyol is obtained by reacting the polyol with hydrogen to decompose hydroxyl groups and is a compound obtained by decomposing the polyol to the extent that at least one hydroxyl group is left.

It is preferred that the medium should contain as a main ingredient a compound having a weight-average molecular weight of 100 or more, preferably 300 to 2000, and more preferably 600 to 1000. If the weight-average molecular weight of the medium is 100 or more, the solubility or dispersibility of the polyrotaxane into the medium can be ensured. As a result, the homogeneity of the polyrotaxane in the flexible polyurethane foam can be increased. If the weight-average molecular weight of the medium is 300 to 2000, the effect of reducing the tensile stress (tensile modulus) of the flexible polyurethane foam can be ensured, depending on the amount of the medium or polyrotaxane blended, while the solubility or dispersibility of the polyrotaxane into the medium can be ensured.

Depending on the type of the medium, the amount of the medium blended is preferably 50 to 200 parts by mass relative to 100 parts by mass of polyrotaxane. This is for the purpose of ensuring the solubility or dispersibility of the polyrotaxane into the medium and concurrently preventing that the amount of the medium blended is excessive relative to the polyol composition (mixture) and thus the medium interferes with the foaming of the flexible polyurethane foam. As the amount of the medium blended relative to 100 parts by mass of polyrotaxane is smaller than 50 parts by mass, the solubility or dispersibility of polyrotaxane into the medium tends to decrease. As the amount of the medium blended is larger than 200 parts by mass, the foamability of the flexible polyurethane foam tends to decrease.

The medium preferably contains as a main ingredient a compound having one or two hydroxyl groups per molecule. This is for the purpose of cross-linking the medium in the skeleton of the flexible polyurethane foam and preventing, by means of the medium, the cross-linking density of the polyrotaxane from becoming high. Since the cross-linking density of the polyrotaxane can be prevented from becoming high, thus ensuring the degree of freedom at which the axle molecule slides through the cross-linking points (cyclic molecules), the tensile stress of the flexible polyurethane foam can be surely reduced. Particularly with the use of the medium having one hydroxyl group per molecule, the effect of preventing, by means of the medium, the cross-linking density of the polyrotaxane from becoming high can be increased.

The medium is preferably a surfactant. The reason for this is that the dispersibility of the polyrotaxane into the medium can be increased. When the medium is a surfactant, the dispersibility of the polyrotaxane can be improved and, thus, the homogeneity of the flexible polyurethane foam can be further increased. The medium is particularly preferably a hydroxyl group-containing, non-ionic surfactant. The reason for this is that it is possible to avoid having any effect on the reaction between the polyol component and the isocyanate component because the non-ionic surfactant includes no atom group that may be dissociated into ions.

The medium preferably contains a polyoxyalkylene group-containing compound as a main ingredient. This is because the compatibility with the polyol component forming a skeleton of the flexible polyurethane foam can be improved. As a result, the dispersibility of the polyrotaxane can be improved and, thus, the homogeneity of the flexible polyurethane foam can be further increased. Examples that can be cited as the polyoxyalkylene group-containing compound include polyoxyalkylene alkyl ether, polyoxyethylene polyoxypropylene alkyl ether, polyoxyethylene polyoxypropylene monobutyl ether, and polyoxypropylene polyoxyethylene alkylamine.

Water is mainly used as the foaming agent. The molding may be performed using the foaming agent, as necessary, in combination with a low-boiling organic compound, such as a small amount of cylcopentane or normal pentane, isopentane or HFC-245fa, or by mixing and dissolving air, nitrogen gas, liquefied carbon dioxide or the like into the stock solution with a gas loading apparatus. The preferred amount of foaming agent added is, depending on the set density of the resultant product, normally 0.5 to 15% by mass relative to the polyol component.

Various kinds of urethanization catalysts known in the art can be used as the catalyst. Examples that can be cited include: reactive amines, such as triethylamine, tripropylamine, tributylamine, N-methylmorpholine, N-ethylmorpholine, dimethylbenzylamine, N,N,N',N'-tetramethylhexamethylenediamine, N,N,N',N',N"-pentamethyldiethylenetriamine, and bis-(2-dimethylaminoethyl) ether; their organic acid salts; metal carboxylates, such as potassium acetate and potassium octylate; and organic metal compounds, such as stannous octoate, dibutyltin dilaurate, and zinc naphthenate. Also preferred are active hydrogen group-containing amine catalysts, such as N,N-dimethylethanolamine and N,N-diethylethanolamine. The preferred amount of catalyst added is 0.01 to 10% by mass relative to the polyol component.

As necessary, a polyvalent active hydrogen compound having a low molecular weight is used as the cross-linking agent. By means of the cross-linking agent, the elastic properties of the urethane pad can be easy to control. Examples that can be cited as the cross-linking agent include polyalcohols, such as ethylene glycol, propylene glycol, 1,4-butane diol, trimethylol propane, and glycerin; compounds obtained by polymerizing ethylene oxide or propylene oxide with any of the above polyalcohols as an initiator; and alkanolamines, such as monoethanolamine, diethanolamine, triethanolamine, and N-methyldiethanolamine. These compounds may be used individually or as a mixture of two or more.

Furthermore, a foam stabilizer is used as necessary. Organic silicon-based surfactants known in the art can be used as the foam stabilizer. The preferred amount of foam stabilizer added is 0.1 to 10% by mass relative to the polyol component. Moreover, as necessary, a flame retardant, a plasticizer, a cell opener, an antioxidant, an ultraviolet ray absorber, a colorant, various fillers, an internal mold release agent, and/or other process aids are used.

Examples

The present invention will be described in further detail with reference to examples; however, the present invention should not be limited to these examples. The compounding ratios of mixture liquids (polyol compositions) for molding urethane pads of Examples and Comparative Examples are shown in Tables 1 and 2. The numerical values shown in Tables 1 and 2 are represented in terms of unit mass (mass ratio). Each isocyanate was blended so that the isocyanate index reached 100.

TABLE 1

|  |  | Example 1 | Comparative example 1 | Example 2 | Comparative example 2 | Example 3 | Example 4 | Comparative example 3 | Example 5 | Example 6 | Example 7 |
|---|---|---|---|---|---|---|---|---|---|---|---|
| polyol | 1 | 75 | 75 | 75 | 75 | 75 | 75 | 75 | 67 | 67 | 47 |
|  | 2 |  |  |  |  |  |  |  |  |  |  |
|  | 3 | 25 | 25 | 25 | 25 | 25 | 25 | 25 | 30 | 30 | 50 |
| medium | 1 | 3 | 3 | 3 | 3 | 3 | 5 | 3 |  |  |  |
|  | 2 |  |  |  |  |  |  |  | 3 | 3 | 3 |
| polyrotaxane | 1 | 3 |  | 3 |  | 3 | 5 |  | 3 | 3 | 3 |
|  | 2 |  |  |  |  |  |  |  |  |  |  |
|  | 3 |  |  |  |  |  |  |  |  |  |  |

TABLE 1-continued

|  |  | Example 1 | Comparative example 1 | Example 2 | Comparative example 2 | Example 3 | Example 4 | Comparative example 3 | Example 5 | Example 6 | Example 7 |
|---|---|---|---|---|---|---|---|---|---|---|---|
| cross-linking agent | | 0.75 | 0.75 | 1.00 | 1.00 | 1.00 | 1.00 | 1.00 | 2.00 | 2.00 | 2.00 |
| cell opener | | 2.00 | 2.00 | 2.00 | 2.00 | 2.00 | 2.00 | 2.00 | 2.00 | 2.00 | 2.00 |
| foam stabilizer | 1 | 0.93 | 0.93 | 0.93 | 0.93 | 0.90 | 0.90 | 0.90 | 0.90 | 0.90 | 0.90 |
|  | 2 | 0.07 | 0.07 | 0.07 | 0.07 | 0.10 | 0.10 | 0.10 | 0.10 | 0.10 | 0.10 |
|  | 3 | | | | | | | | | | |
|  | 4 | | | | | | | | | | |
| catalyst | 1 | 0.35 | 0.35 | 0.35 | 0.35 | 0.35 | 0.35 | 0.35 | 0.30 | 0.35 | 0.40 |
|  | 2 | 0.10 | 0.10 | 0.10 | 0.10 | 0.10 | 0.10 | 0.10 | 0.10 | 0.10 | |
| water | | 2.90 | 2.90 | 2.90 | 2.90 | 2.90 | 2.90 | 2.90 | 2.90 | 2.90 | 2.20 |
| isocyanate | 1 | 51.7 | 51.5 | 52.7 | 52.4 | 52.7 | 53.2 | 52.4 | 52.4 | 52.4 | |
|  | 2 | | | | | | | | | | 33.4 |
| density (kg/m$^3$) | | 62.5 | 62.2 | 62.0 | 63.0 | 63.0 | 62.6 | 62.0 | 62.0 | 61.0 | 60.9 |
| 25% ILD (N/314 cm$^2$) | | 289.7 | 289.0 | 294.6 | 290.6 | 287.5 | 267.6 | 295.7 | 283.3 | 259.6 | 295.3 |
| deflection (mm) | | 31.5 | 31.8 | 31.1 | 31.8 | 31.7 | 33.3 | 30.8 | 31.8 | 33.8 | 30.6 |
| tensile strength (kPa) | | 147.6 | 148.1 | 138.1 | 159.1 | 126.0 | 154.8 | 166.8 | 146.0 | 129.5 | 159.3 |
| elongation (%) | | 119.1 | 115.0 | 116.6 | 115.8 | 105.8 | 122.5 | 115.0 | 102.5 | 99.2 | 97.5 |
| tensile modulus (kPa) | | 82.6 | 87.0 | 77.6 | 89.1 | 78.9 | 85.5 | 96.0 | 81.5 | 74.2 | 83.3 |

TABLE 2

|  |  | Example 8 | Example 9 | Example 10 | Example 11 | Example 12 | Comparative example 4 |
|---|---|---|---|---|---|---|---|
| polyol | 1 | | | | | | |
|  | 2 | 49 | 47 | 45 | 95 | 95 | 95 |
|  | 3 | 50 | 50 | 50 | | | |
| medium | 1 | | | | | | |
|  | 2 | 1 | 3 | 5 | 5 | 5 | 5 |
| polyrotaxane | 1 | | | | | | |
|  | 2 | 1 | 3 | 5 | 5 | | |
|  | 3 | | | | | 5 | |
| cross-linking agent | | 2.00 | 2.00 | 2.00 | 2.00 | 2.00 | 2.00 |
| cell opener | | 2.00 | 2.00 | 2.00 | 2.00 | 2.00 | 2.00 |
| foam stabilizer | 1 | 0.70 | 0.70 | 0.70 | 0.70 | 0.70 | 0.70 |
|  | 2 | | | | | | |
|  | 3 | 0.30 | 0.30 | 0.30 | | | |
|  | 4 | | | | 0.30 | 0.30 | 0.30 |
| catalyst | 1 | 0.35 | 0.35 | 0.35 | 0.35 | 0.35 | 0.35 |
|  | 2 | | | | | | |
| water | | 2.00 | 2.00 | 2.00 | 2.00 | 2.00 | 2.00 |
| isocyanate | 1 | | | | | | |
|  | 2 | 31.3 | 32.0 | 32.7 | 33.4 | 33.3 | 32.7 |
| density (kg/m$^3$) | | 64.5 | 63.1 | 61.9 | 69.8 | 72.5 | 71.7 |
| 25% ILD (N/314 cm$^2$) | | 298.9 | 246.0 | 198.9 | 122.5 | 125.4 | 163.7 |
| deflection (mm) | | 30.7 | 33.8 | 36.1 | 39.4 | 39.5 | 43.1 |
| tensile strength (kPa) | | 176.3 | 140.6 | 115.2 | 95.6 | 83.4 | 104.5 |
| elongation (%) | | 90.0 | 96.7 | 98.7 | 108.3 | 109.1 | 103.3 |
| tensile modulus (kPa) | | 93.6 | 67.8 | 54.7 | 50.4 | 49.0 | 60.2 |

The components shown in Tables 1 and 2 are as follows.

Polyol 1: polyether polyol EP828 (manufactured by Mitsui Chemicals, Inc.), 6000 weight-average molecular weight;

Polyol 2: polyether polyol EP330N (manufactured by Mitsui Chemicals, Inc.), 5000 weight-average molecular weight;

Polyol 3: polymer polyol POP3623 (manufactured by Mitsui Chemicals, Inc.);

Medium 1: non-ionic surfactant ET116B (manufactured by Dai-ichi Kogyo Seiyaku Co., Ltd.), polyoxyalkylene alkyl ether (higher alcohol), 750 weight-average molecular weight, one hydroxyl group per molecule;

Medium 2: polyether polyol EL720 (manufactured by Asahi Glass Co., Ltd.), 700 weight-average molecular weight, two hydroxyl groups per molecule;

Polyrotaxane 1: an alkylated modified form of SH1310P (manufactured by Advanced Softmaterials Inc.), in which SH1310P containing cyclodextrins (cyclic molecules) included on polyethylene glycol (an axle molecule) is alkylated at part of a hydroxyl group of the cyclic molecule with butyl isocyanate, 11000 molecular weight of the axle molecule, 43 mgKOH/g hydroxyl value;

Polyrotaxane 2: SH1310P (manufactured by Advanced Softmaterials Inc.), 11000 molecular weight of the axle molecule, 85 mgKOH/g hydroxyl value;

Polyrotaxane 3: SH2410P (manufactured by Advanced Softmaterials Inc.), in which cyclodextrins (cyclic molecules) are included on polyethylene glycol (an axle molecule), 20000 molecular weight of the axle molecule, 76 mgKOH/g hydroxyl value;

Cross-linking agent: diethanolamine;

Cell opener: EP505S (manufactured by Mitsui Chemicals, Inc.);

Foam stabilizer 1: L3625 (manufactured by Momentive Performance Materials Inc.);

Foam stabilizer 2: SF2936F (manufactured by Dow Corning Toray Co., Ltd.);

Foam stabilizer 3: SF2945F (manufactured by Dow Corning Toray Co., Ltd.);

Foam stabilizer 4: B8736LF2 (manufactured by Evonik Japan Co., Ltd);

Catalyst 1: TEDA-L33 (manufactured by Tosoh Corporation);

Catalyst 2: Toyocat ET (manufactured by Tosoh Corporation);

Isocyanate 1: polymeric MDI, a mixture of 2,4'-MDI and 4,4'-MDI; and

Isocyanate 2: TM20 (manufactured by Mitsui Chemicals, Inc.).

These components were compounded in the mass ratios shown in Tables 1 and 2. In Examples 1 to 12 (examples where a polyrotaxane was blended), a polyrotaxane was first added to a medium and the mixture was stirred at 50° C. for 30 minutes. After it was confirmed that the medium reached a homogeneous solution, the solution was cooled to room temperature. A polyol was uniformly mixed into the cooled solution and other components were then uniformly mixed to obtain a mixture liquid. Next, a predetermined amount of the mixture liquid was poured into an urethane pad molding tool (a lower portion thereof) having a predetermined shape and foamed and cured in the cavity to obtain an urethane pad of each of Examples 1 to 12. Since a polyrotaxane is dissolved or dispersed into a medium and other components are then mixed with the medium, the polyrotaxane can be well dispersed in the urethane pad.

Each of urethane pads of Comparative Examples 1 to 4 (examples where no polyrotaxane was blended) was obtained by compounding the individual components in the mass ratio shown in Table 1 or 2 in the usual manner, uniformly mixing them, then pouring a predetermined amount of the mixture into an urethane pad molding tool (a lower portion thereof) having a predetermined shape.

All the urethane pads were measured in terms of density, 25% ILD (hardness), deflection, tensile strength, elongation, tensile modulus. The results are shown in Tables 1 and 2. The density was calculated by taking a cuboid test piece 100 mm long, 100 mm wide, and 50 mm high from the center of the urethane pad and measuring the mass of the test piece (unit: kg/m$^3$).

The 25% ILD was measured after preliminary compression in the following method conforming to the JIS K6400-2 (2012 edition) D method. The preliminary compression was performed according to the following manner. A test piece was taken from the urethane pad and put on a support plate with the center of the test piece aligned with the center of a pressing plate. For the test piece with a skin on one side, the test piece was put on the support plate with its skin side facing the support plate. The position of the pressing plate (a 200 mm diameter flat disc) when applying a force of 5 N to the test piece thereby was considered to be an initial position and the thickness of the test piece at that time was read to tenths of a millimeter. Thereafter, a pressure was applied to the test piece by the pressing plate at a speed of 100 mm/min until 75% of the thickness of the test piece was reached and, then immediately, the pressing plate was moved back to the initial position at the same speed (thus far is the preliminary compression). After the preliminary compression, the test piece was allowed to stand for 20 seconds, pressed by the pressing plate to 25% of the thickness thereof at a speed of 100 mm/min, and held for 20 seconds and the force at that time was read as a hardness (25% ILD, unit: N/314 cm$^2$). JIS K6400-2 is a Japanese Industrial Standard established based on ISO 2439 (4th edition: published in 2008), ISO 3386-1 (2nd edition: published in 1986), and ISO 3386-2 (2nd edition: published in 1997).

The deflection was measured after preliminary compression in the following manner conforming to the JIS K6400-2 (2012 edition) E method. The preliminary compression was performed according to the following manner. A test piece was taken from the urethane pad and put on a support plate with the center of the test piece aligned with the center of a pressing plate. For the test piece with a skin on one side, the test piece was put on the support plate with its skin side facing the support plate. The position of the pressing plate (a 200 mm diameter flat disc) when applying a force of 5 N to the test piece thereby was considered to be an initial position and the thickness of the test piece at that time was read to tenths of a millimeter. Thereafter, a pressure was applied to the test piece at a speed of 50 mm/min until 75% of the thickness of the test piece was reached and, then immediately, the pressing plate was moved back to the initial position at the same speed (thus far is the preliminary compression). After the preliminary compression, the test piece was allowed to stand for 60 seconds, a pressure was then applied to the test piece at a speed of 50 mm/min by the pressing plate until 75% of the thickness thereof was reached and, then immediately, the pressing plate was moved back to the initial position at the same speed. During this operation, the deflection (unit: mm) when a load of 490 N was applied during application of the pressure was measured.

The tensile strength was measured in the following manner conforming to JIS K6400-5 (2012 edition). A test piece was taken from the urethane pad using a dumbbell-shaped punching tool and two parallel marked lines were put on a parallel portion of the test piece at equal distances from the center line of the test piece and perpendicularly to the longitudinal direction so that the test piece does not deform. The distance between the marked lines was 40 mm. Clamps of a tensile tester were fitted on the test piece symmetrically so that a tensile force was uniformly applied to the cross section of the center of the test piece, the tensile test was conducted at a speed of 200 mm/min, and the maximum force and the distance between the marked lines at breakage were measured. The tensile strength (unit: kPa) was determined by dividing the maximum force at breakage by the cross-sectional area of the test piece before the test. JIS K6400-5 is a Japanese Industrial Standard established based on ISO 1798 (4th edition: published in 2008) and ISO 8067 (2nd edition: published in 2008).

The elongation at breakage (unit: %) was determined by dividing the distance obtained by subtracting the distance between the marked lines before the test from the distance between the marked lines at breakage obtained by the above tensile test conforming to the JIS K6400-5 (2012 edition) by the distance between the marked lines before the test.

The tensile modulus was measured in the following manner conforming to the JIS K6400-5 (2012 edition). A test piece was taken from the urethane pad using a dumbbell-shaped punching tool and two parallel marked lines were put on a parallel portion of the test piece at equal distances from the center line of the test piece and perpendicularly to the longitudinal direction so that the test piece does not deform. The distance between the marked lines was 40 mm. Clamps of a tensile tester were fitted on the test piece symmetrically so that a tensile force was uniformly applied to the cross section of the center of the test piece, the tensile test was conducted at a speed of 200 mm/min, and the tensile force and the distance between the marked lines were measured until the breakage of the test piece.

A stress-strain curve was prepared by plotting the strain obtained by dividing the distance obtained by subtracting the distance between the marked lines before the test from the distance between the marked lines when a tensile force was applied by the distance between the marked lines before the test on the abscissa against the stress σ obtained by dividing the tensile force by the cross-sectional area of the test piece before the test on the ordinate. The tensile modulus is a value obtained by dividing the tensile force when a predetermined elongation is applied to the test piece by the cross-sectional area of the test piece before the test. In these examples, a stress (σ[Strain0.5]) at a strain of 0.5 was determined and the value calculated from the calculation formula σ[Strain0.5]/0.5 was defined as a tensile modulus (unit: kPa).

Figure 4:
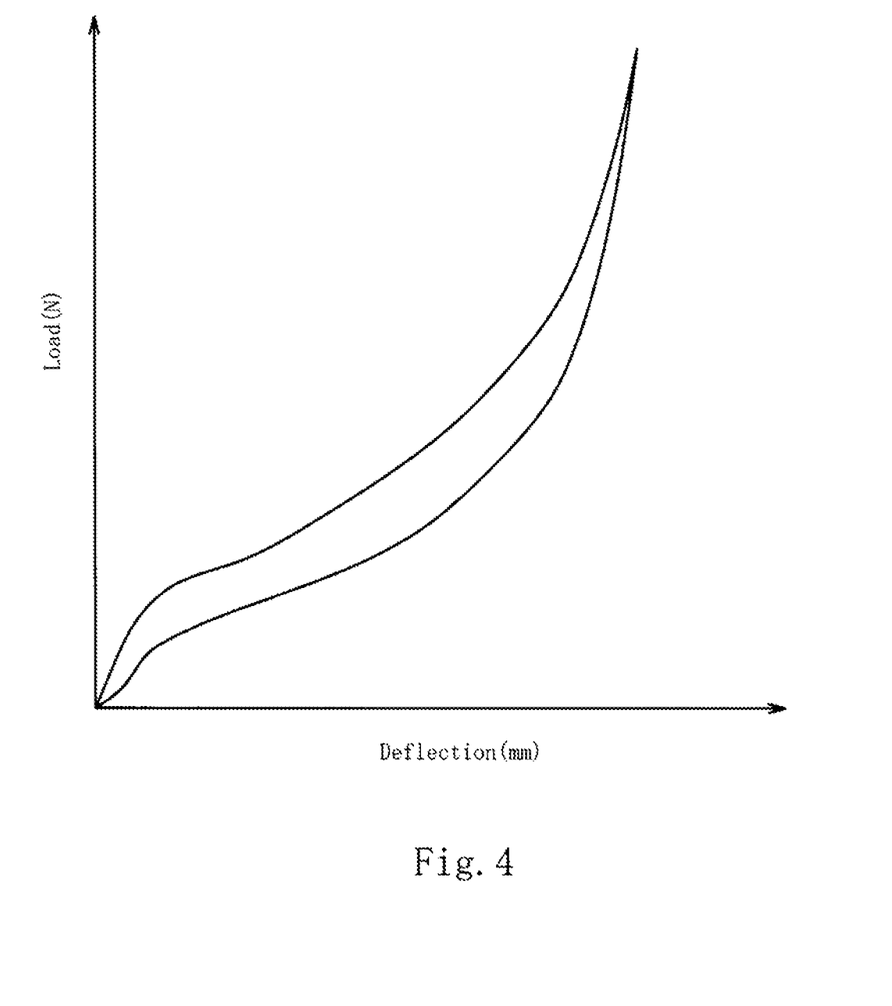
FIG. 4 shows a force-deflection curve when test pieces of flexible polyurethane foams have been compressed.
Figure 5:
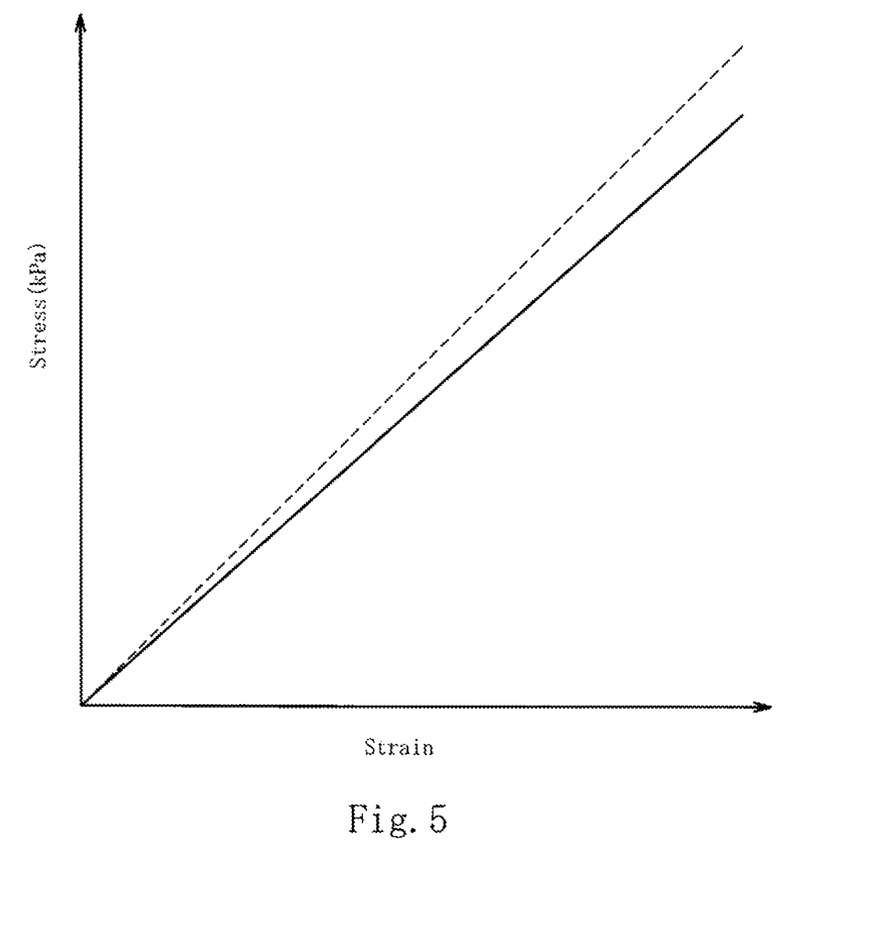
FIG. 5 shows stress-strain curves when a tensile force has been applied to test pieces of flexible polyurethane foams.

FIG. 4 is a force-deflection curve prepared based on measurement results when test pieces of flexible polyurethane foams were compressed in the method conforming to the JIS K6400-2 (2012 edition) E method. The abscissa is deflection, the ordinate is force, and the solid line is a force-deflection curve of Example 2. The force-deflection curve of Comparative Example 2 was superimposed on the force-deflection curve (solid line) of Example 2. FIG. 5 shows stress-strain curves prepared based on measurement results when a tensile force was applied to test pieces of flexible polyurethane foams in the method conforming to JIS K6400-5 (2012 edition). The abscissa is strain and the ordinate is tensile stress. The solid line is a stress-strain curve of Example 2 and the broken line is a stress-strain curve of Comparative Example 2.

Since as shown in FIG. 4 the force-deflection curve of Example 2 is superimposed on the force-deflection curve of Comparative Example 2, it can be said that the compressive properties of Example 2 are approximately equal to the compressive properties of Comparative Example 2. On the other hand, since as shown in FIG. 5 the inclination of the stress-strain curve (solid line) of Example 2 is smaller than the inclination of the stress-strain curve (broken line) of Comparative Example 2, it has been confirmed that Example 2 can have a lower tensile modulus than Comparative Example 2.

As shown in Table 1, Example 1 and Comparative Example 1 have the same composition, Example 2 and Comparative Example 2 have the same composition, and Examples 3 and 4 and Comparative Example 3 have the same composition, each except for polyrotaxane. In comparison between each pair and set above, it has been confirmed that each example is approximately equal in density, 25% ILD (hardness), and deflection to the relevant comparative example, but Examples 1 to 4 containing polyrotaxane blended therein can have smaller tensile moduli than Comparative Examples 1 to 3 containing no polyrotaxane blended therein.

The amount of polyrotaxane blended in Example 4 is 5 parts by mass larger than the amounts (3 parts by mass) of polyrotaxane blended in Examples 1 to 3, but it has been confirmed that Example 4 can have a smaller tensile modulus than Comparative Example 3 containing no polyrotaxane blended therein.

Examples 5 to 7 contain a polyol as a medium and are different in medium type from Examples 1 to 4. It has been confirmed that Examples 5 to 7 whose media for dissolving polyrotaxanes are polyols can have smaller tensile moduli than Comparative Examples 1 to 3 containing no polyrotaxane blended therein.

As shown in Table 2, Examples 8 to 10 have the same composition except for polyrotaxane and polyol 2 (polyether polyol). According to Examples 8 to 10, it has been confirmed that as the amount of polyrotaxane blended increases, the tensile modulus decreases.

Examples 11, 12 and Comparative Example 4 have the same composition except for polyrotaxane. According to Examples 11, 12 and Comparative Example 4, it has been confirmed that the tensile modulus can be reduced by the blending of a polyrotaxane.

Although description has been omitted in the above examples, it has been confirmed that when 0.9 to 30 parts by mass of polyrotaxane is blended relative to 100 parts by mass of polyol component by appropriately selecting the types and compounding ratios of the polyol component, the isocyanate component, the polyrotaxane, and so on, the tensile modulus can be reduced as compared with the urethane pads containing no polyrotaxane blended therein.

Although the present invention has been described so far with reference to the embodiment, the present invention is not limited to the above embodiment and it can be easily inferred that various modifications and changes can be made without departing from the spirit of the present invention. For example, the shapes described in the above embodiment are merely illustrative and it is naturally possible to employ other shapes.

Although in the above embodiment the description has been given of the urethane pad (cushion material) made of flexible polyurethane foam to be mounted on a vehicle (motor vehicle), the present invention is not necessarily limited to this. It is naturally possible to apply the flexible polyurethane foam to a cushion material or a back pad material to be mounted on vehicles (for example, railway vehicles) other than motor vehicles, ships, boats, aircraft, or other conveyances or to a cushion material or a mat material for furniture or the like.

Although in the above embodiment the description has been given of the case where the polyrotaxane 13 is added into the polyol composition for producing a flexible polyurethane foam 10, the present invention is not necessarily limited to this and it is naturally possible to add a cross-linked polyrotaxane in which polyrotaxanes 13 are cross-linked with each other. The reason for this is that even if the polyrotaxane is a cross-linked polyrotaxane so long as cyclic molecules 14 include surplus functional groups, the cyclic molecules 14 can be cross-linked with a flexible polyurethane foam 10 when the flexible polyurethane foam 10 is formed by the reaction of the hydroxyl groups of the polyol component with the isocyanate groups of the isocyanate component.

Although in the above embodiment the description has been given of the method for producing a flexible polyurethane foam 10 in which a polyrotaxane 13 containing hydroxyl groups as functional groups of the cyclic molecules 14 is used, the polyrotaxane 13 is not necessarily limited to this. So long as the cyclic molecules 14 of a polyrotaxane 13 include functional groups capable of cross-linking when the polyol component reacts with the isocyanate component to form urethane, any such polyrotaxane 13 can be used without limitation.

Although in the above embodiment the description has been given of the case where in producing a flexible polyurethane foam 10, a polyrotaxane 13 is dissolved or dispersed in a medium before being mixed with a polyol component or an isocyanate component, the present invention is not necessarily limited to this. With the use of a polyrotaxane (a modified form of polyrotaxane) having high affinity for the polyol component or the isocyanate component, the polyrotaxane can be uniformly dissolved or dispersed in the polyol component or the isocyanate component without using any medium.

The above embodiment also discloses the following invention. A polyol composition A1 for producing a flexible polyurethane foam contains a polyol component, an isocyanate component, and a polyrotaxane, wherein the polyrotaxane includes an axle molecule including cyclic molecules thereon in a skewered manner and stopper groups placed at both ends of the axle molecule.

In the polyol composition A1, the polyrotaxane has a hydroxyl value of 30 to 85 mgKOH/g.

In the polyol composition A1 or A2, the polyrotaxane is blended in 0.9 to 30 parts by mass relative to 100 parts by mass of the polyol component.

A flexible polyurethane foam obtained by foaming and curing any one of the polyol compositions A1 to A3.

According to the polyol composition A1, it contains the polyol component, the isocyanate component, and the polyrotaxane. Since the polyrotaxane includes: an axle molecule including cyclic molecules thereon in a skewered manner; and stopper groups placed at both ends of the axle molecule, the cyclic molecules of the polyrotaxane are cross-linked with a flexible polyurethane foam when the flexible polyurethane foam is formed by the reaction of the hydroxyl groups of the polyol component with the isocyanate groups of the isocyanate component. In the polyrotaxane, the axle molecule slides through the cross-linking points (cyclic molecules) to such an equilibrium position that a tension acting on the flexible polyurethane foam becomes equalized, thus distributing the stress heterogeneity. Therefore, the flexible polyurethane foam can reduce the tensile stress as compared with a flexible polyurethane foam containing no polyrotaxane blended.

When lateral vibrations in a low-frequency band are input to a urethane pad made of this flexible polyurethane foam with a user sitting on the urethane pad, a vertical compressive stress due to the user's weight and a tensile stress due to the input of the lateral vibrations act on the urethane pad. The direction (inclination) of a resultant force obtained by combining the compressive stress and the tensile stress can be brought close to the vertical direction if the tensile stress of the flexible polyurethane foam can be reduced because the polyrotaxane has substantially no effect on the compressive properties of the flexible polyurethane foam. Thus, the angle of inclination of the user's hip (ischium) to the vertical direction due to the input of vibrations can be reduced, which has the effect of reducing the sense of wobble of the urethane pad.

According to the polyol composition A2, since the hydroxyl value of the polyrotaxane is 30 to 85 mgKOH/g, this can prevent the cross-linking density of the cyclic molecules from being too high. As a result, the degree of freedom at which the cyclic molecules can move along the axle molecule after being cross-linked can be ensured. Thus, in addition to the effects of the polyol composition A1, the effect is produced of ensuring the effect of reducing the tensile stress of the flexible polyurethane foam.

According to the polyol composition A3, the polyrotaxane is blended in 0.9 to 30 parts by mass relative to 100 parts by mass of the polyol component. Therefore, in addition to the effects of the polyol composition A1 or A2, the effect is produced of preventing the polyrotaxane from interfering with the foaming of the flexible polyurethane foam and is produced of certainly reducing the tensile stress of the flexible polyurethane foam.

According to the flexible polyurethane foam obtained by foaming and curing any one of the polyol compositions A1 to A3, the same effects as the polyol composition A1 is obtained.

The invention claimed is:

1. A polyurethane forming composition for producing a flexible polyurethane foam, the polyurethane forming composition containing a polyol component, an isocyanate component capable of reacting with the polyol component, a polyrotaxane, a medium capable of dissolving or dispersing the polyrotaxane, and a foaming agent,
   wherein the polyrotaxane includes an axle molecule including hydroxyl group-containing cyclic molecules thereon in a skewered manner and stopper groups placed at both ends of the axle molecule.

2. The polyurethane forming composition according to claim 1, wherein the medium contains as a main ingredient a compound having a weight-average molecular weight of 100 or more.

3. The polyurethane forming composition according to claim 1, wherein the medium contains as a main ingredient a compound having one or two hydroxyl groups per molecule.

4. The polyurethane forming composition according to claim 1, wherein the medium is a surfactant.

5. The polyurethane forming composition according to claim 1, wherein the medium contains a polyoxyalkylene group-containing compound as a main ingredient.

6. A flexible polyurethane foam obtained by foaming and curing a composition, the composition including:
   a polyol component;
   an isocyanate component capable of reacting with the polyol component;
   a polyrotaxane including an axle molecule including hydroxyl group-containing cyclic molecules thereon in a skewered manner and stopper groups placed at both ends of the axle molecule; and
   a medium capable of dissolving or dispersing the polyrotaxane.

7. A method for producing a flexible polyurethane foam, comprising:
   a first step of obtaining a solution in which a polyrotaxane is dissolved or dispersed in a medium;
   a second step of obtaining a mixture liquid by mixing the solution obtained in the first step with a polyol component and an isocyanate component capable of reacting with the polyol component; and a third step of foaming and curing the mixture liquid obtained in the second step, wherein the polyrotaxane includes an axle molecule including hydroxyl group-containing cyclic molecules thereon in a skewered manner and stopper groups placed at both ends of the axle molecule.

* * * * *